United States Patent [19]

Hooykaas

[11] 4,272,293
[45] Jun. 9, 1981

[54] PROCEDURE FOR THE TREATMENT OF COMBINED WET FILTER CAKES

[75] Inventor: Carel W. J. Hooykaas, Rotterdam, Netherlands

[73] Assignee: Pelt & Hooykaas B.V., Rotterdam, Netherlands

[21] Appl. No.: 925,366

[22] Filed: Jul. 17, 1978

[30] Foreign Application Priority Data

Jul. 22, 1977 [NL] Netherlands ........................ 7708196
Dec. 27, 1977 [NL] Netherlands ........................ 7714456

[51] Int. Cl.³ ............................................. C04B 23/04
[52] U.S. Cl. ................................. 106/73.6; 106/117; 405/128; 405/129
[58] Field of Search ............... 106/51, 73.1, 103, 109, 106/117, 236; 405/128, 129

[56] References Cited

U.S. PATENT DOCUMENTS

| | | | |
|---|---|---|---|
| 837,918 | 12/1906 | Colloseus | 106/117 |
| 2,528,103 | 10/1950 | Willson | 106/103 |
| 3,642,445 | 2/1972 | Muter et al. | 106/288 B |
| 3,684,539 | 8/1972 | Bartholomew | 106/51 X |
| 3,718,003 | 2/1973 | Cook et al. | 106/288 B |

*Primary Examiner*—G. O. Peters
*Attorney, Agent, or Firm*—Edmund M. Jaskiewicz

[57] ABSTRACT

A procedure for the treatment of filter cakes obtained during the purification of chemical substances in liquid form, especially during the purification of phosphoric acid obtained by wet methods, whereby a filter cake is dried and heated in the presence of a melt of inorganic material.

22 Claims, No Drawings

PROCEDURE FOR THE TREATMENT OF COMBINED WET FILTER CAKES

BACKGROUND OF THE INVENTION

The invention relates to a procedure for the treatment of filter cakes obtained during the purification of chemical substances in liquid form, especially during the purification of phosphoric acid obtained by wet methods, such as for the preparation of tripoly-phosphates.

In is known per se that phosphoric acid can be obtained by the decomposition of phosphate ores with sulphuric acid, whereby on the one hand phosphoric acid is obtained, and secondly gypsum ($CaSO_4.2H_2O$). The phosphoric acid from the decomposed material, which is obtained after removal of the majority of the gypsum, still contains a large number of impurities such as titanium, zinc, cadmium, manganese, chromium, vanadium, lead, uranium, fluorine, copper, arsenic and rare earth metals. However, these impurities do not cause any interference during the processing of the phosphoric acid to give phosphate fertilizers.

For certain purposes, for example for the preparation of tripolyphosphates or other phosphate compounds, it is necessary to use a much more highly purified phosphoric acid, which is achieved by the purification of phosphoric acid obtained by wet methods.

During this purification operation different filter cakes are formed which contain significant quantities of impurities in the form of vanadium, mercury, uranium, fluorine and the like. Because of the presence of heavy metals and fluorine, these filter cakes must not be discharged to open water courses so as to prevent environmental pollution whilst dumping on open ground is also forbidden because of the possibility of leaching during storage in the atmosphere caused by rainfall and the like.

Of the various filter cakes which are obtained during the further purification of phosphoric acid the following can be mentioned:

(a) an initial filter cake which consists of 80-85% gypsum, plus small quantities of various metals such as iron, aluminium, magnesium, chromium, vanadium, copper, also a small quantity of carbon;

(b) a second filter cake which is deposited after removal of the first filter cake which consists mainly of gypsum, the said second filter cake containing sodium phosphate, sodium aluminium silicate, iron hydroxide, magnesium silicate, calcium fluoride, chromium trioxide, zinc oxide, plus for example titanium, cadmium, manganese, vanadium, mercury, lead, rare earth metals, uranium and carbon;

(c) a third filter cake consisting of disodium phosphate, ferric hydroxide, magnesium fluoride with for example significant quantities of vanadium pentoxide plus for example titanium, cadmium, manganese, chromium, mercury, lead, lanthanum, uranium and carbon, all dependent on the raw material from which the phosphoric acid has been prepared.

The latter-mentioned cake, which consists mainly of disodium phosphate, ferric hydroxide, magnesium fluoride and vanadium oxide is obtained as filter cake during the final purification of the phosphoric acid.

The filter cakes which are formed during the purification of phosphoric acid obtained by wet methods are extremely large, so that attempts are being made to find a solution which obviates the problems mentioned above.

SUMMARY OF THE INVENTION

This objective is achieved in accordance with the present invention by virtue of the fact that a filter cake is dried and heated in the presence of a melt of inorganic material. By heating a filter cake in the presence of a melt, the filter cake is absorbed in the melt, whereby the harmful metals can hardly be leached out during the storage period in the external air.

During heating in the presence of a melt of inorganic material, preferably a metallurgical melt such as a phosphoric furnace slag melt or a blast furnace slag melt which in the molten state are at a temperature of roughly 1350° C., the said filter cakes furthermore melt completely or partially, so that their volume is considerably reduced.

With advantage the said melt is formed by heating filter cakes until one or more filter cakes melt, preferably at above 500° C., and suitably at 700°-1300° C.

Such an embodiment is extremely advantageous because no other substances need to be added during the processing of the filter cakes.

The fact has emerged that during the heating of a filter cake up to melting point, the filter cakes become glassy and subsequently reduce their volume five-fold. Furthermore the resultant dried and melted material firmly retains the harmful heavy metals present, such as vanadium, mercury, uranium, fluorine and the like, so that leaching out by water is precluded.

As a result of this procedure it is consequently possible to store the filter cakes which have been heated up to melting point and which exhibit a much smaller volume more easily even outdoors, because the harmful metals present can no longer be leached out. It has even proved possible to use the material which has been heated up to melting point as road-making material. This consequently signifies that by heating up to melting point, on the one hand environmental pollution is avoided caused by possible leaching out of harmful metals from the filter cakes, whilst secondly a by-product suitable for industrial use is obtained.

The filter cake products obtained by heating, and which exhibit a much reduced volume, can be used as road-making materials. This signifies that by heating up to melting point on the one hand the environmental pollution caused by the possible leaching out of harmful materials from the filter cakes, is prevented, while secondly a valuable by-product for industrial use is obtained.

With particular advantage an initial dried filter cake containing gypsum is mixed with a dried second and/or third filter cake and all these are heated up to melting point.

Extremely appropriately heating is carried out up to a temperature of at least 900° C.-950° C., whereby the entire mixture of gypsum filter cake together with a second and/or third filter cake becomes liquid.

It is appropriate to mix the gypsum-containing initial filter cake with an excess of the second and/or third filter cake, especially two parts of the initial filter cake with three parts of a second and/or third filter cake.

After the melting of a filter cake, whether or not in the presence of another material, it is advisable to keep the molten material in motion so as to give the carbon present in the material an opportunity to escape. For this purpose it is also possible to supply additive materials to the filter cakes to be melted down, such as iron oxide or a calcium compound such as CaO.

DESCRIPTION OF PREFERRED EMBODIMENTS

Example I

Commercially available concentrated phosphoric acid with a pH of 2.2 is filtered, this giving an initial filter cake which consists to a significant extent (for example 75–80%) of gypsum.

Subsequently, by suitable treatment, a second sludge-like filter cake is obtained. This material contains practically all the silicate present in the acid, which is to be removed by purification, so that this cake contains a considerable quantity of disodium phosphate, sodium aluminium silicate, and magnesium silicate and—if present in the basic ore—iron. Furthermore this cake can contain heavy metals such as vanadium, mercury, uranium and fluorine, of these are present in the initial acid.

This filter cake is dried by heating and after drying it is heated up to 800° C., whereby melting starts. As a result of this heating operation the volume of the filter cake decreases to 1/5th of the original volume, whilst no heavy metal such as vanadium, mercury, uranium and fluorine and the like can be extracted from the resultant cake.

The material obtained is broken up and used for road construction.

After this the phosphoric acid is subjected to a third purification stage, giving a third filter cake, said filter cake consisting essentially of disodium phosphate (more than 50% of the cake) plus ferric hydroxide, magnesium fluoride and vanadium oxide, also small quantities of mercury, lead, rare earth metals, uranium, titanium, zinc, cadmium and manganese. By drying this cake and heating it up to a temperature of 800° C. we also obtain a significant reduction in the volume of the filter cakes, from which no heavy metals can be leached out.

This third filter cake can be mixed with the first-mentioned second filter cake, giving a cake from which no heavy metals can be extracted. The mixing of the two filter cakes gives an improved effect as compared with that of each of the cakes individually. Heating is undertaken for at least three minutes at 800° C. and suitably for 10–20 minutes, although these limits impose no restrictions. It is appropriate to continue heating until no further reduction in volume takes place.

It is recommended that non-skid-enhancing stabilizers be added to the melts thus obtained, preferably sand particles. In this way a melt is obtained which, when broken up, gives particles having a high non-skid ratio, so that this material is extremely suitable for use in road making.

Instead of sand particles it is also possible to add corundum particles or similar particles which increase the non-skidability of the particles obtained during disintegration.

Example II

Commercially available concentrated phosphoric acid with a pH of 2.2 is filtered, this giving an initial filter cake which consists mainly, for example 75–80%, of gypsum. This cake is dried and provides the initial gypsum filter cake.

Subsequently by suitable treatment of the phosphoric acid a second mud-like filter cake is obtained, which contained practically all the silicate to be removed from the acid by purification, so that this second filter cake contains significant quantities of disodium phosphate, sodium aluminium silicate and magnesium silicate and—if present in the initial ore—also iron. Furthermore this cake can contain heavy metals such as vanadium, mercury, uranium, and fluorine if these are present in the initial acid. This second filter cake is also dried by heating.

Subsequently the phosphoric acid is subjected to a third purification operation giving a third filter cake which consists mainly of disodium phosphate (more than 50% of the cake) plus ferric hydroxide, magnesium fluoride and vanadium oxide together with small quantities of mercury, lead, rare earth metals, uranium, titanium, zinc, cadmium and manganese. This third filter cake is also dried by heating.

Subsequently two parts of the first filter cake are mixed with three parts of the second filter cake in dry form, after which this is heated up to 950° C. The mixture then becomes runny. To give the carbon present in the mixture an opportunity to escape, the cake is stirred somewhat.

Thereafter the melt is broken up into particles which can be used for road making. Heavy metals cannot be leached out from these particles.

To enhance the non-skid properties of the material obtained, it is recommended that for example 10% sand be added to the mixture. After mixing the melt with the sand particles, the melt is allowed to solidify, after which it is broken up. As a result of the presence of the sand particles a road making material with high non-skidding properties is obtained.

Example III

Two parts of the first filter cake are mixed with two parts of the second filter cake and one part of the third filter cake in dry form and this is heated up to 950° C. This gives a molten mass which is agitated so as to give carbon opportunity to escape.

The melt obtained solidifies on cooling down, after which this is broken up into pieces which are very suitable for road making.

An especially good material is obtained by adding 10% sand particles to the cake, whereby the non-skid properties of the particles are considerably improved. If the sand is replaced by corundum particles, the said properties increase even further.

It is also possible to subject the melt particles obtained to an etching treatment so as to increase the non-skid properties.

The fact has emerged that in this way the first filter cake can be processed together with the second filter cake and/or third filter cake quite well to give particles suitable for road making, in which the heavy metals present in the cake are combined in such a way that they cannot be leached out.

It has emerged especially that by mixing the second filter cake and third filter cake with the first filter cake, the leaching out of metals is considerably reduced as compared with that obtaining when only the second and/or third filter cakes are melted. The addition of the first gypsum-containing cake similarly leads to a synergistic effect.

Example IV

The first filter cake obtained in accordance with the method described in example I during the purification of concentrated phosphoric acid, the second filter cake and the third filter cake are dried by heating to beyond 100° C.

After this the mixture of the three filter cakes is added to a molten blast furnace slag at 1350° C. During this the filter cakes melt completely whilst reducing their volume to 1/5th of their original volume. After cooling down the slag is broken up and the combined heavy metals can no longer be leached out. The same results are obtained using a molten phosphorous furnace slag. The broken particles of the blast furnace slag and the phosphorous furnace slag are very well suited for road making.

What is claimed is:

1. In a process for the treatment of metal-containing filter cakes formed during the purification of wet phosphoric acid obtained by wet methods, the improvement comprising heating the filter cake to above 500° C. in the presence of an inorganic melt whereby said metals are absorbed in the melt.

2. The process of claim 1, wherein the melt is formed by heating a dried filter cake.

3. The process of claim 1, wherein a filter cake is dried and added to molten metallurgical slag material.

4. The process of claim 1 wherein the filter cake contains silicate compounds.

5. The process of claim 1 wherein the filter cake contains disodium phosphate, sodium aluminium silicate, ferric hydroxide, magnesium silicate, calcium fluoride, chromium trioxide, zinc oxide and carbon.

6. The process of claim 1 wherein the filter cake consists mainly of disodium phosphate, ferric hydroxide and magnesium fluoride.

7. The process of claim 6, wherein the filter cake contains vanadium.

8. The process of claim 1 wherein a plurality of said filter cakes are mixed before heating.

9. The process of claim 8 wherein an initial dry gypsum-containing filter cake obtained by purification is mixed with at least one of a dried second and a third filter cake, all of which is heated until melting occurs.

10. The process of claim 9, wherein at least equal parts of a dried initial filter cake are mixed with equal parts of at least one of a dried second and third filter cake.

11. The process of claim 9, wherein a dried gypsum-containing initial filter cake is mixed with an excess of at least one of a dried second and third filter cake.

12. The process of claim 10, wherein two parts of a dried initial filter cake being mixed with three parts of at least one of a dried second and third filter cake.

13. The process of claim 9, wherein a liquid filter cake is obtained and is kept in motion so as to give the carbon present in the cake an opportunity to escape.

14. The process of claim 10, wherein non-skid-enhancing stabilizers are added to the melt obtained.

15. The process of claim 14, wherein said non-skid-enhancing stabilizers consist of sand particles.

16. The process of claim 14, wherein corundum particles are added to the melt as non-skid-enhancing stabilizers.

17. The process of claim 1 wherein the resultant melt is broken up.

18. The process of claim 9, wherein a second filter cake contains sodium phosphate, sodium aluminium, iron hydroxide, magnesium silicate, calcium fluoride, chromium trioxide, zinc oxide, titanium, cadmium, manganese, vanadium, mercury, lead, rare earth metals, uranium and/or carbon.

19. The process of claim 9 wherein a third filter cake consists of disodium phosphate, ferric hydroxide, magnesium fluoride, which may comprise vanadium pentoxide, titanium, cadmium, manganese, chromium, mercury, lead, lanthanum, uranium and/or carbon.

20. The process of claim 1, wherein the initial filter cake consists of 80–85% gypsum and the remainder of small quantities of other metals such as iron, aluminium, magnesium, chromium, vanadium, copper and carbon.

21. The process of claim 1 wherein the melt is formed by heating above 500° C. materials present in the filter cake.

22. The process of claim 21 wherein the meltable materials present in the filter cake are melted down completely between 700° and 1000° C.

* * * * *